(12) United States Patent
Schutzman et al.

(10) Patent No.: US 7,599,905 B2
(45) Date of Patent: *Oct. 6, 2009

(54) METHOD AND SYSTEM FOR ALLOCATING MULTIPLE ATTRIBUTE STORAGE PROPERTIES TO SELECTED DATA STORAGE RESOURCES

(75) Inventors: Neil F. Schutzman, Marlboro, MA (US); Madhav Mutalik, Southborough, MA (US); Thomas L. Dings, Hopkinton, MA (US); Ajay Shekhar, Medway, MA (US); Ananthan K. Pillai, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 142 days.

This patent is subject to a terminal disclaimer.

(21) Appl. No.: 11/673,060

(22) Filed: Feb. 9, 2007

(65) Prior Publication Data

US 2007/0143367 A1    Jun. 21, 2007

Related U.S. Application Data

(63) Continuation of application No. 09/909,025, filed on Jul. 19, 2001, now Pat. No. 7,200,609.

(51) Int. Cl.
| | |
|---|---|
| G06F 17/30 | (2006.01) |
| G06F 17/00 | (2006.01) |
| G06F 11/00 | (2006.01) |
| G06F 13/00 | (2006.01) |

(52) U.S. Cl. ............................... 707/1; 707/3; 707/100; 707/200; 714/7; 711/114

(58) Field of Classification Search ................. 707/1–3, 707/100, 102, 200, 203, 204–206; 709/220–225; 711/100, 111–114, 147–148, 207–209; 714/4–7
See application file for complete search history.

(56) References Cited

U.S. PATENT DOCUMENTS 2,129,216 A   9/1938   Johnston (Continued)

FOREIGN PATENT DOCUMENTS

WO    WO 2004/021190    *   3/2004

(Continued)

OTHER PUBLICATIONS

H. Jayaram et al. "The Impact of Smart Disks and Spatial Reuse Property on RAID-5 Storage Systems", Proceedings of the 1998 International Conference on Parallel Processing Workshops.*

(Continued)

*Primary Examiner*—Srirama Channavajjala
(74) *Attorney, Agent, or Firm*—Daly, Crowley, Mofford & Durkee, LLP (57) ABSTRACT

A method of attribute based resource allocation is presented. A resource such as a pool of storage has certain properties or attributes associated with portions of the pool. When a request for storage is needed, the requester provides a selection expression which comprises properties and logical operators. From the selection expression a determination is made to allocate portions of the storage pool which meet the requirements of the selection expression.

17 Claims, 5 Drawing Sheets

U.S. PATENT DOCUMENTS

| | | | |
|---|---|---|---|
| 5,018,060 A | | 5/1991 | Gelb et al. |
| 5,247,660 A | | 9/1993 | Ashcraft et al. |
| 5,303,369 A | | 4/1994 | Borcherding et al. |
| 5,491,810 A | | 2/1996 | Allen |
| 5,598,528 A | * | 1/1997 | Larson et al. ............. 714/7 |
| 5,708,798 A | * | 1/1998 | Lynch et al. ............. 703/1 |
| 5,740,371 A | | 4/1998 | Wallis |
| 5,765,154 A | | 6/1998 | Horikiri et al. |
| 5,778,368 A | * | 7/1998 | Hogan et al. ............. 707/10 |
| 5,787,242 A | * | 7/1998 | DeKoning et al. ......... 714/5 |
| 5,897,661 A | * | 4/1999 | Baranovsky et al. ....... 711/170 |
| 5,960,451 A | * | 9/1999 | Voigt et al. .............. 711/114 |
| 5,983,316 A | * | 11/1999 | Norwood ................. 711/112 |
| 6,085,262 A | | 7/2000 | Sawada .................. 710/38 |
| 6,122,685 A | * | 9/2000 | Bachmat ................. 710/74 |
| 6,249,883 B1 | * | 6/2001 | Cassidy et al. ........... 714/42 |
| 6,353,846 B1 | | 3/2002 | Fleeson |
| 6,453,376 B1 | | 9/2002 | Fairman et al. |
| 6,457,008 B1 | | 9/2002 | Rhee et al. |
| 6,523,065 B1 | | 2/2003 | Combs et al. |
| 6,530,035 B1 | * | 3/2003 | Bridge .................... 714/6 |
| 6,671,789 B1 | * | 12/2003 | He et al. ................. 711/170 |
| 7,185,164 B2 | * | 2/2007 | Kusama et al. ........... 711/170 |
| 7,200,609 B2 | * | 4/2007 | Schutzman et al. ....... 707/104.1 |
| 2001/0047482 A1 | * | 11/2001 | Harris et al. ............. 713/200 |
| 2002/0129216 A1 | | 9/2002 | Collins |
| 2002/0194179 A1 | | 12/2002 | Siefert |

FOREIGN PATENT DOCUMENTS

WO    WO 2006061315    *    6/2006

OTHER PUBLICATIONS

File downloaded from PAIR for U.S. Appl. No. 09/909,025, filed Jul. 19, 2001, U.S Patent No. 7,200,609 issued Apr. 3, 2007, file through May 26, 2009, 280 pages.

* cited by examiner

METHOD AND SYSTEM FOR ALLOCATING MULTIPLE ATTRIBUTE STORAGE PROPERTIES TO SELECTED DATA STORAGE RESOURCES

CROSS REFERENCE TO RELATED APPLICATIONS

The present application is a Continuation of U.S. patent application Ser. No. 09/909,025, filed on Jul. 19, 2001, now issued U.S. Pat. No. 7,200,609, which is incorporated herein by reference.

STATEMENT REGARDING FEDERALLY SPONSORED RESEARCH

Not Applicable.

FIELD OF THE INVENTION

The present invention relates generally to resource allocation and more particularly to resource allocation based on attributes associated with the particular process requesting the resource.

BACKGROUND OF THE INVENTION

As is known in the art, allocation of resources plays an important role in computer systems. Resources such as storage resources are required to perform certain tasks. For example, a database administrator (DBA) can request storage resources required to perform a backup operation so that the storage resource will have certain characteristics when used for restore. In such a case, the DBA requesting the resource may simply request an amount of storage (e.g. 100 Gigabytes) necessary to perform the restore operation. The DBA does not know specifics regarding the storage. That is, no details regarding the type, speed or other properties regarding the requested storage are included with the DBA request.

A storage administrator (SA) receives the DBA request, assesses the available storage resources and allocates a pool of storage to the DBA. The DBA then uses the so-allocated storage to perform the restore operation. The pool of storage allocated by the SA is typically provided from a subset of the storage resources which the SA knows to be available. Each of the storage resources making up the storage pool allocated by the SA typically have different characteristics or properties. For example, one storage resource in the storage pool may be faster than another storage resource. The DBA must, however, operate with whatever resources the SA allocates to the DBA.

One problem with this approach is that the resources allocated to the DBA may have characteristics which are less than optimum for the operation which the DBA must perform. That is, the pool of storage made available to the database administrator may not necessarily be the best possible storage for the intended operation. For example, the DBA may optimally perform an operation with storage having a certain characteristic (e.g. the storage must be fast). The storage resources which make up the storage pool, however, may not have such a characteristic. Thus, the DBA may be allocated storage that is less then the optimal storage available to fulfill the request. Furthermore, the DBA may be allocated storage that would be better served by other requests for storage.

It would, therefore, be desirable to efficiently allocate the resources in a processing system. It would be further desirable to have a system and technique which responds to a party requesting a resource by allocating resources to the requesting party based on resource attributes specified by the requesting party. It would also be desirable to provide a technique which allows a party to specify particular resource attributes in a resource request.

SUMMARY OF THE INVENTION

In accordance with the present invention, a method of generating a storage pool includes defining one or more storage resource properties and associating at least one storage property with at least one storage resource. With this particular arrangement, a technique which provides a level of abstraction between a storage pool and a database administrator (DBA) is provided. By defining storage properties and assigning one or more storage properties to one or more storage resources, storage pools comprised of storage resources having known properties can be formed. Since the properties of the storage resources which comprise the storage pool are known, a DBA can request a storage resource by specifying a storage property and a storage amount required for a particular application or process. The DBA can specify the storage characteristics via a logical, expression which defines the required storage characteristics. The DBA thus need not know the details of the storage devices from which the storage pools are formed. In data replication applications, such a system and technique facilitates data backup operations.

In accordance with a further aspect of the present invention, a method of specifying storage includes providing a list of resource properties to a database administrator (DBA) and selecting one or more properties to build an expression which specifies desired storage characteristics in a storage resource needed for a particular application. With this particular arrangement, a technique for defining a storage resource is provided. By enabling the DBA to define required storage by defining storage characteristics required for a particular application, the DBA need not know the details of the specific storage devices which comprise the storage in order to reserve storage resources for a particular application. The method thus provides the DBA with a level of abstraction when specifying and using a pool of storage.

In accordance with a still further aspect of the present invention, a method of executing a storage operation by a database administrator (DBA) includes evaluating an expression to determine a pool of storage and selecting one or more pieces of storage having characteristics defined by storage properties in the expression. With this particular arrangement, a technique for performing a database operation which requires a storage having particular characteristics or attributes is provided. By enabling the DBA to evaluate storage specified by logical expressions of storage characteristics, the DBA can rapidly locate and use storage required for a particular application.

BRIEF DESCRIPTION OF THE DRAWINGS

The invention will be more fully understood from the following detailed description taken in conjunction with the accompanying drawings, in which.

DETAILED DESCRIPTION OF THE INVENTION

As used herein, the term "storage resource" or more simply "storage" refers to any device capable of having information stored thereon. Examples of storage include but are not limited to disk storage, tape storage, random access memory (RAM) and optical storage. Each storage resource can correspond to a physical device or a logical volume. A "storage property" or more simply a "property" refers to a characteristic of a storage resource. For example, a storage resource may be characterized as being fast, slow, mountable on production, used for test, etc. . . . Also, in accordance with the present invention and as will be described in further detail below, in addition to characterizing a storage resource according to familiar properties (e.g. fast, slow, etc. . . ) a user can define a distinct property which can then be assigned to a storage resource.

It should be appreciated that the physical structures for storing information may be provided by a variety of means including but not limited to means which are magnetic, electronic, electric, electrostatic, ferroelectric, optical, acoustic, chemical, or mechanical in nature. In short, as used herein, the term storage is intended to cover any device in which information can be stored regardless of the manner in which the information is stored.

A "storage pool" refers to a collection of storage resources which are considered or treated as a group by a system or database administrator. Thus, a storage pool can be formed from physical devices and/or logical volumes. As will be described in detail below, an in accordance with one aspect of the invention, users who want to implement the concept of storage pools can do so via a criteria based storage selection technique. In this technique, attributes are assigned to individual pieces of storage and then the user can select these attributes and combine them using logical operators (e.g. AND, OR, NOT, etc.) to form the criteria that is used to select the storage for a particular activity.

A storage or system administrator (SA) refers to an individual who can monitor which physical devices or logical volumes in a storage pool are available for use and who can define storage attributes or properties and access control lists (ACLS) on storage.

The term database administrator (DBA) refers to an individual who is responsible for the definition, operation, protection, performance and recovery of a database. The DBA is thus the individual who understands and manages a user's database. To fulfill the above responsibilities and perform the database management functions, the DBA typically utilizes a database management system (DBMS) which generally is a hardware and software system. The DBMS provides a systematic approach to generating, storing, retrieving, backing-up, recovering and otherwise processing information stored in a database. The DBMS acts as an interface between programs executing on a computer and data files as well as between users and the database.

It should be understood that although in the examples given below, a certain procedure or process may be described as being accomplished via a certain portion of a processing system (e.g. an DBMS or an SAS) or by a certain individual (e.g. a DBA or an SA) such examples are intended only for clarity in explanation and are not intended to be limiting.

Those of ordinary skill in the art will appreciate that the concepts explained below can be implemented in a wide variety of different portions of a processing system and that a particular process can be carried out by input from any individual with the requisite knowledge to do so.

Figure 1:
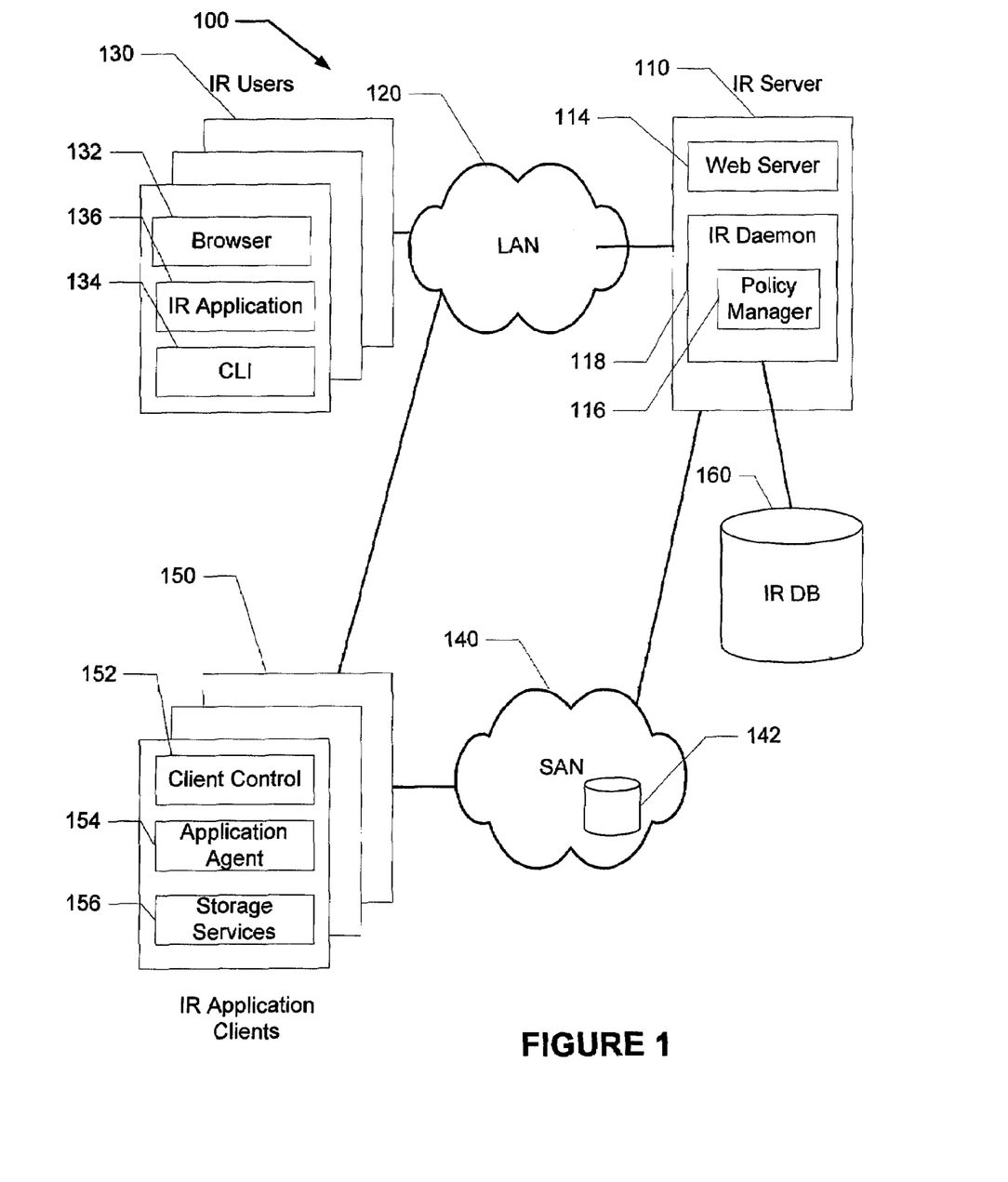
FIG. 1 is a diagram of an replication application Architecture.

Referring now to FIG. 1, an exemplary information restore system 100 in accordance with the present invention is shown. A replication application server 100, which includes persistent storage 160, handles activity requests from clients. A web server 114 provides an interface to a Local Area Network (LAN) 120, for example, to enable communication with user desktop machines 130, which can include a user interface, e.g., browser 132 and/or command line interface 134, and a replication application 136. The replication application server 110 can also include a replication application service and policy manager 116 to handle schedule replication activities, as described in detail below. The application replication server 110 also communicates with a storage area network (SAN) 160, in which data is stored. The system 100 further includes application clients 150, e.g., Oracle databases, that are under client control 152 via an application agent 154 and storage service module 156.

In one particular embodiment, the application replication server 110 includes a daemon 118 for controlling and coordinating replication activity for storage units that are visible to the respective clients. The application replication server 110 can further include a Replication Policy Manager or Engine 116 for each supported replication technology to implement decisions regarding what storage to use for a given replication. In one embodiment, the policy engine 116 can be a dynamic library that is linked with the Daemon 118. Static state information about existing replications and the corresponding storage is stored in the application replication database 160, which can be provided as an SQL Server database.

The application agent 154 in the application replication application client 150 processes the user's database, which resides in the storage area network 140. This client control module 152, which can be provided as a daemon, handles and dispatches client operations. Application agents or plug-ins 154 for each supported application handle work requests. The application clients 150 can also communicate with third party vendors via call outs, for example, for driving a third party product to backup a replication of the users database.

While shown as three separate clients, it is understood that one or more of the user, application client and application replication server can reside on a single host or machine. It is further understood that the particular embodiments, architectures and configurations can be readily modified by one of ordinary skill in the art to meet the requirements of a particular application without departing from the present invention.

Figure 2:
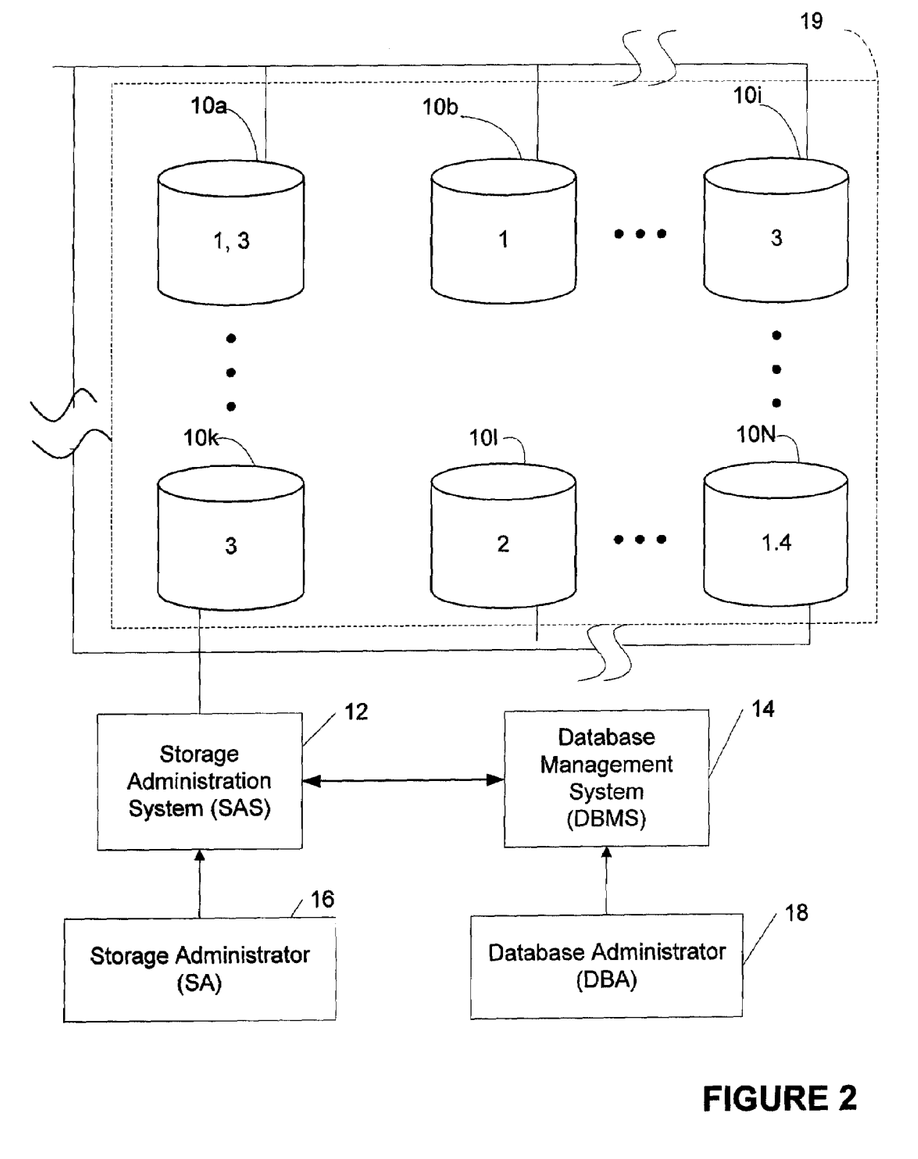
FIG. 2 is a block diagram of a storage administrator (SA) and a database administrator (DBA) coupled to an attribute based storage pool.

Referring now to FIG. 2, a plurality of storage resources 10a-10N, generally denoted 10, has a storage administration system (SAS) 12 and a database management system (DBMS) 14 coupled thereto. The storage resources 10 may correspond to physical devices or logical volumes. A storage administrator (SA) 16 manages the manages the storage 10 via the SAS 12 and a database administrator (DBA) 18 manages the storage 10 via the DBMS 14.

The SA 16 interrogates or otherwise receives information about each of the storage resources 10a-10N and generates storage properties for one or more of the storage resources 10a-10N. The SA 16, via the SAS 12, then forms a table or other organizational or relational device in which the SA 16 assigns or otherwise associates particular storage properties to particular ones of the storage resources 10a-10N.

Table 1 below, for example, lists storage characteristics by property numbers. For example, if Property No. 1 is assigned to a storage resource, this indicates that the storage resource is characterized as being fast. On the other hand a storage resource having Property No. 2 is characterized as being slow.

TABLE 1

| Property No. | Characteristic |
|---|---|
| 1 | Fast |
| 2 | Slow |
| 3 | Usable for test |
| 4 | Mountable On Production |

As shown in FIG. 2, the SA 16 has assigned property numbers (1) and (3) to the storage resource 10a and thus storage resource 10a is now characterized in the system as being "fast" and "mountable on production." Similarly, the SA 16 has assigned property number 1 to storage resource 10b and thus storage resource 10b is now characterized in the system as being "fast." Similarly still, storage resources 10i, 10k are characterized as being "usable for test." Storage resource 10l has the "slow" property while storage resource 10N has both the "fast" and "mountable on production" properties associated with it. In this manner, the SA effectively establishes or logically forms a resource pool 19.

It should be appreciated that each storage resource 10 can be assigned or associated with as many or as few properties as a user desires. That is, even though a storage resource may be both "fast" and "mountable on production" in some applications it may be desirable or even necessary to only assign the "mountable on production" property to the storage resource. Also, not every storage resource necessarily has a storage property associated with it. Each user community comes up with it's own set of properties for particular applications. It should also be noted that it is possible to group properties to specific machines. For example, one can specify that all Symmetrix machines of a particular type are to be identified as "fast" or "mountable on production" or "usable for test."

Once the SA 16 has assigned properties to various pieces of storage, the database administrator (DBA) 18, via the DBMS 14, generates a logical expression which defines the type of storage required for a particular operation which the DBA 18 desires to perform. For example, the DBA 18 may want to duplicate a database on storage having particular storage properties. Once the DBA 18 defines the logical expression which identifies the desired storage properties of a storage device on which the DBA 18 wishes to duplicate the database, the properties are compared to the storage which has been identified and labeled by the SA 16.

For example, if the SA 16 defines storage resources 10N as having the characteristics "fast" and "usable for test," and the DBA 18 generates an expression which says that a "fast" and "usable for test" storage device is required, then only storage device 10N meets these properties and thus storage device 10N is assigned to the DBA 18 for the desired operation. If more than one storage device meets the request, a further determination can be made to determine which device is best-suited for the task. The results from the present invention can be fed to another processing application to determine which storage has the best combined characteristics for the application. For example, do not choose storage that is all on the same disk spindle.

It should also be appreciated that the technique of the present invention can be layered on any other storage pooling system. That is, the SA 16 and DBA 18 need not specify physical devices. Rather, they can specify logical devices.

It is also possible to generate an expression using properties which have not yet been assigned to any storage (i.e. no storage having the properties in the expression have been defined). In this case, before a database operation can be completed, the storage must be defined. However the DBA 18 can notify the SA 16 that storage of a particular type is required and the SA 16 will search for appropriate pieces of storage and generate a storage pool having the characteristics desired by the DBA 14. This can be referred to as a "push" operation since the DBA 18 notifies the SA 16 that more storage having a particular characteristic is required.

Figure 3:
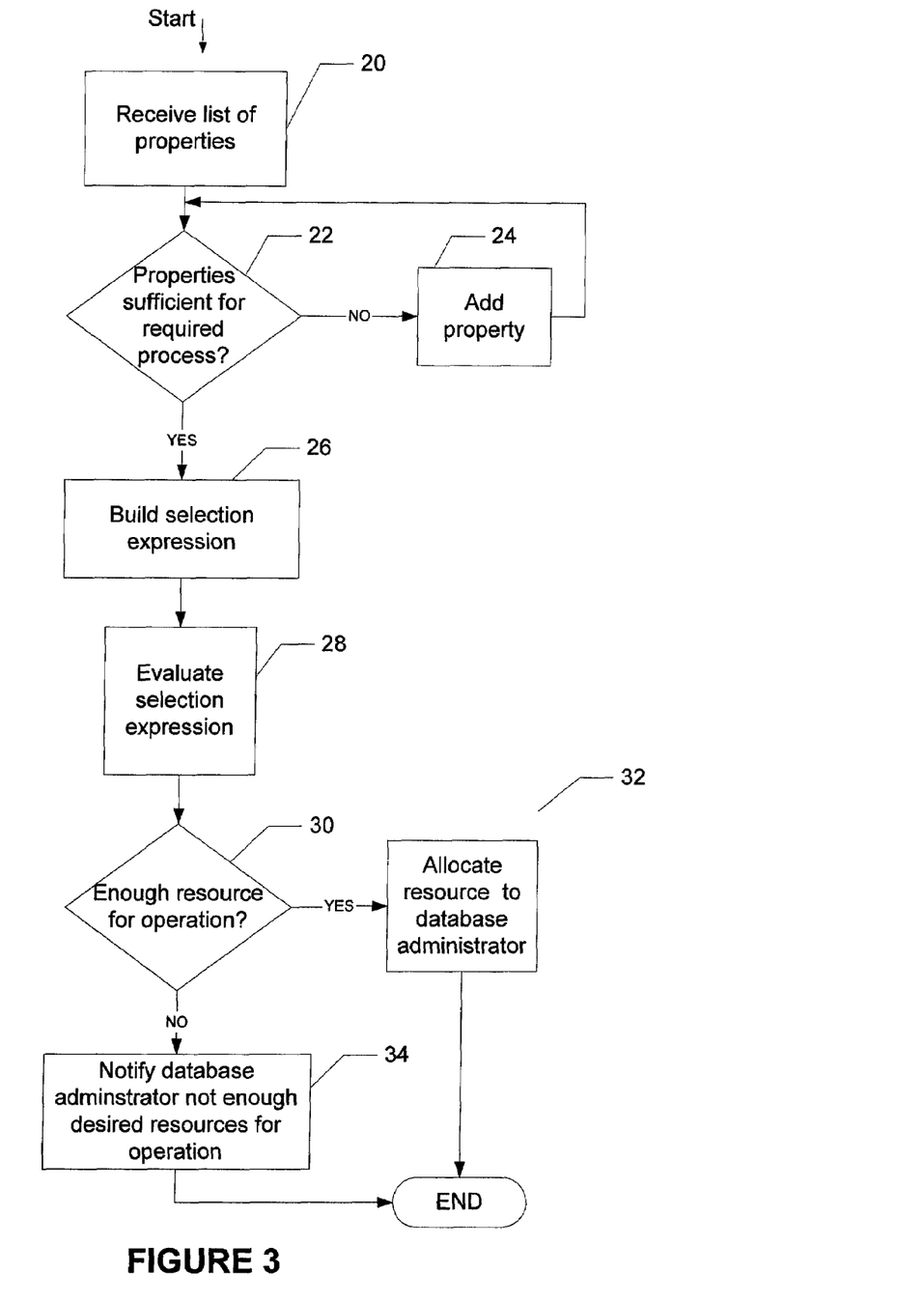
FIG. 3 is a flow diagram which illustrates the processing required to request and assign resources.

FIG. 3 is a flow diagram showing the processing performed to by portions of a system such as that shown in FIG. 2 to generate resource pools and assign resources to portions of a processing system in need of or requesting resources. The rectangular elements (typified by element 20 in FIG. 3), are herein denoted "processing blocks" and represent computer software instructions or groups of instructions. The diamond shaped elements (typified by element 22 in FIG. 3), are herein denoted "decision blocks" and represent computer software instructions, or groups of instructions which affect the execution of the computer software instructions represented by the processing blocks. Thus, some of the processing blocks can represent an empirical procedure or a database operation while others can represent computer software instructions or groups of instructions.

Alternatively, the processing and decision blocks can represent processes performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Turning now to FIG. 3, one embodiment of a technique for requesting and assigning resources begins with step 20 in which a list of storage properties are provided to a DBA. As discussed above in conjunction with FIG. 2, a wide range of storage properties, including user-defined storage properties are available to the DBA. The storage properties generally relate to some characteristic of the storage such as fast, slow, etc. . .

Processing then continues to decision block 22 in which a determination is made as to whether the list of storage properties provided to the DBA include those storage properties which the DBA desires for an allocation of storage resources for a particular operation. For example, the DBA may be seeking resources to perform an operation such as a database restore. In this case, the DBA may desire storage having the properties of "fast" and "mountable on production." As shown in decision block 22, if the properties desired by the DBA do not exist in the list of properties provided to the DBA, then processing proceeds to block 24 where an additional property is added. Processing then returns to decision block 22. This loop can be repeated as many times as necessary until a satisfactory set of properties sufficient for the required process is available.

If in decision block 22 a determination is made that the properties desired by the DBA exist in the list of properties provided to the DBA in processing block 20, then processing proceeds to block 26 where the DBA (or other qualified individual or processing element in the system) "builds" or otherwise forms a "selection expression" or more simply an "expression" to specify the characteristics of the resource(s) desired for the operation to be performed.

The details of the so-formed expression will be described below in conjunction with FIG. 4. Suffice it here to say, however, that the expression includes one or more resource properties and, in those cases where more than one resource property is specified, the expression also includes one or more logical operators which relate the resource properties. For example, an appropriate expression could be "fast AND mountable on production" where the terms "fast" and "mountable on production" correspond to the resource properties and the term "AND" corresponds to the logical operator. Another exemplary expression is "slow AND NOT mountable on production."

Once the expression is formed, processing proceeds to processing block 28 in which the selection expression is evaluated. In one embodiment, an SA system evaluates the selection expression. The evaluation is typically performed at run time by the SA system to determine a resource pool. In particular, the SA system locates storage resources from the resource pool which was logically formed as discussed above.

Processing then proceeds to decision block 30 where a decision is made as to whether enough resources having the properties specified by the DBA system (or other qualified individual or processing element in the system) exist to carry out the desired operation.

If a decision is made that enough resources exist, then processing proceeds to processing block 32 where the resources are allocated to the DBA system. Thus, in step 32 the storage that meets the expression properties is selected and a validation is performed to assure that enough storage for the operation exists. If the system validates that enough resources are available to complete the operation, then the resources are allocated and the operation is completed and processing ends.

It should be appreciated that the DBA system need not know any of the specifics concerning the allocated resources. That is, the DBA system need not request specific resources (i.e. the DBA system need not specify particular physical device(s) or logical volumes(s)) to fulfill the DBA request. The DBA system only need know that the SA system allocates resources having the resource characteristics specified by the DBA system in the selection expression. After the resources are allocated, then processing ends.

If in decision block 30 a decision is made that not enough resources (e.g. storage resources or other resources) exists for the operation, then processing proceeds to processing block 34 in which the system provides an indication to the database administrator that the operation cannot be preformed (i.e. the operation fails). The system can then identify the resources which are needed. Processing then ends.

In the event that an operation fails, the system can simply stop and proceed no further as shown in FIG. 3. In an alternate embodiment, in the event that not enough resources are available to complete an operation, then the system can attempt to perform the operation on a "best try" basis. Alternatively still, in the event that not enough resources are available to complete an operation, the system can identify the resources and attempt to find the missing resources so that the operation can be completed.

Figure 4:
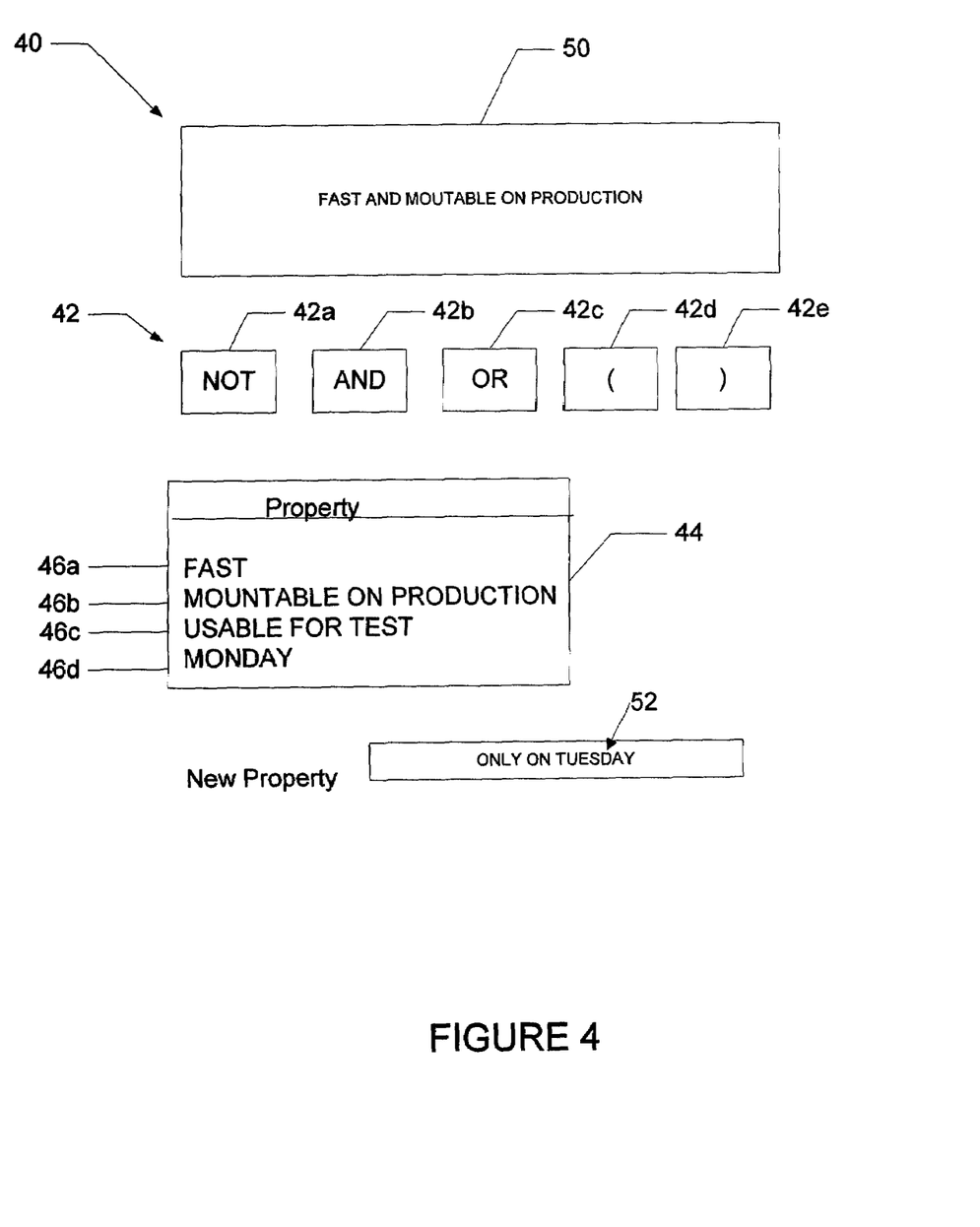
FIG. 4 is a diagrammatic view of an exemplary interface which can be used to build selection expressions.

Referring now to FIG. 4, an interface 40 for building selection expressions includes a plurality of logical operator controls or "buttons" 42a-42e. In this particular example, there are controls for the logical operators NOT, AND, OR, LEFT PARENTHESIS and RIGHT PARENTHESIS respectfully designated as 42a-42e. The logical controls 42a-42e are used to generate various selection expressions.

Figure 4A:
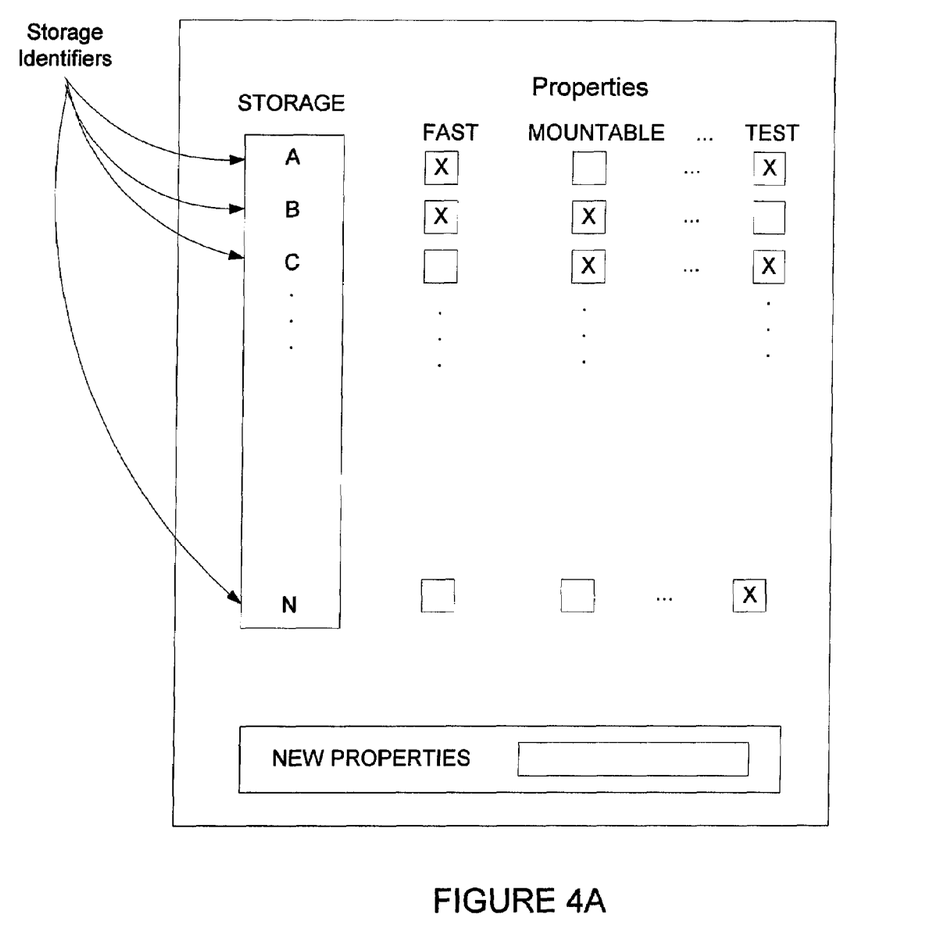
FIG. 4A is a diagrammatic view of an exemplary interface showing different properties associated with different pieces of storage.

Interface 40 also includes a property box 44 which contains a list of existing properties which can be used in the construction of a selection expression. In this example, the properties are FAST, MOUNTABLE ON PRODUCTION, USABLE FOR TEST and MONDAY, which are respectfully designated as 46a-46d. FIG. 4A shows different properties associated with different pieces of storage.

It should be understood that although the present example contemplates five logical controls 42a-42e (generally denoted 42) and four properties 46a-46d (generally denoted 46), any number of logical controls 42 and properties 46 can be specified. The particular number and types of logical controls 42 as well as the particular number and types of properties 46 to use in any particular application can be selected in accordance with a variety of factors including but not limited to the type of operation or operations to be performed by the DBA, the number of operations to be performed by the DBA, and the type and nature of the resources required to perform the operation(s).

In one example in which the database administrator seeks to perform a database replication, assume that the DBA will build an equation to produce the selection expression "fast AND mountable on production" by clicking on controls 46a, 42b and 46b. In this manner, a selection expression designated by reference numeral 50 in FIG. 4, can be accordingly produced. The selection expression 50 can then be provided to the SA, along with a request for the amount of storage needed (e.g. 100 Gb).

Once the selection expression is defined, the expression is evaluated at run time by the SA to determine a pool of sorts, as discussed above in conjunction with FIG. 3.

If there exists an application in which a resource having a particular property is desired but the property is not included in the property list 44, then the desired property can be added as a new property 52. In this particular example, it is desired to use a resource which is only available on Tuesday. Thus the property, "ONLY ON TUESDAY" is entered into the new property field and is added to the properties list 44.

In another aspect of the present invention, it should be appreciated that it is possible to have the resource assignment and allocation system of the present invention initially identify all storage as being "hands-off" (i.e. not available for property identification allocation and assignment). This can be accomplished, for example, upon the installation of the resource assignment and allocation system. Alternatively, the resource assignment and allocation system can identify all storage as "can-use" meaning that all of the storage is available for use.

In the case where all storage is identified as hands-off, since each piece of storage is not available for property identification allocation and assignment, each piece of storage available for use must be identified (e.g. by an SA, DBA, user or other individual). If a piece of storage is not affirmatively identified as available for use, then it will not be available. Once a piece of storage is affirmatively identified, a storage property can be assigned to it.

Similarly, in the case where all the storage is identified as can use, the user would identify the storage which should be hands off. This approach allows the invention to operate with a non-cooperating storage administrator. While the above-described method is usable for any type of resource allocation, the method is particularly well suited when used as part of an information recovery system.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. Accordingly, it is submitted that the invention should not be limited to the described embodiments but rather should be limited only by the spirit and scope of the appended claims. All publications and references cited herein are expressly incorporated herein by reference in their entirety.

What is claimed:

1. A computer-implemented method of creating a data storage pool, comprising:
   providing information for a plurality of storage resources in response to a user query;
   assigning, in a computer having a processor, at least one storage property to selected ones of the plurality of storage resources in response to user instructions to define the data storage pool;
   receiving a logical expression to identify respective ones of the storage resources that are available for a requested store operation based upon the storage properties assigned to the selected ones of the storage resources;
   determining which ones of the identified storage resources have preferred characteristics;
   allocating selected ones of the identified storage resources for the requested store operation;
   receiving, prior to the step of allocating selected ones of the identified storage resources, a new storage property for the logical expression if a desired storage property is not present in the assigned storage properties,
   wherein the logical expression includes a storage property not assigned to any of the storage resources, and further including:
      receiving an identification of a first one of the plurality of storage resources having the unassigned storage property; and
      allocating the first one of the storage resources based upon the logical expression.

2. The method according to claim 1, wherein the logical expression includes at least one logical operator and at least two storage properties.

3. The method according to claim 2, wherein the logical expression includes an amount of storage needed for the requested store operation.

4. The method according to claim 1, further including assigning a particular one of the at least one storage properties to a particular type of storage resource.

5. The method according to claim 1, wherein the plurality of storage resources includes logical volumes.

6. The method according to claim 1, further including receiving a user instruction to identify a storage resource as hand-off storage.

7. The method according to claim 1, wherein the user query is generated by a storage administrator.

8. The method according to claim 1, wherein the logical expression is generated by a database administrator.

9. The method according to claim 1, wherein the preferred characteristics include storage resources having multiple disk spindles.

10. An article, comprising:
    a computer readable storage medium having stored thereon instructions that when executed by a computer result in the following:
    providing information for a plurality of storage resources in response to a user query;
    assigning at least one storage property to selected ones of the plurality of storage resources in response to user instructions to define the data storage pool;
    receiving a logical expression to identify respective ones of the storage resources that are available for a requested store operation based upon the storage properties assigned to the selected ones of the storage resources;
    determining which ones of the identified storage resources have preferred characteristics;
    allocating selected ones of the identified storage resources for the requested store operation; and
    receiving, prior to the step of allocating selected ones of the identified storage resources, a new storage property for the logical expression if a desired storage property is not present in the assigned storage properties, wherein the logical expression includes a storage property not assigned to any of the storage resources, and further including:
       receiving an identification of a first one of the plurality of storage resources having the unassigned storage property; and
       allocating the first one of the storage resources based upon the logical expression.

11. The article according to claim 10, wherein the logical expression includes at least one logical operator and at least two storage properties.

12. The article according to claim 10, wherein the logical expression includes an amount of storage needed for the requested store operation.

13. The article according to claim 10, further instructions to include assigning a particular one of the at least one storage properties to a particular type of storage resource.

14. A system, comprising:
    a processor; and
    a memory coupled to the processor, the memory including instructions that when executed result in the following:
    providing information for a plurality of storage resources in response to a user query;
    assigning at least one storage property to selected ones of the plurality of storage resources in response to user instructions to define the data storage pool;
    receiving a logical expression to identify respective ones of the storage resources that are available for a requested store operation based upon the storage properties assigned to the selected ones of the storage resources;
    determining which ones of the identified storage resources have preferred characteristics:
    allocating selected ones of the identified storage resources for the requested store operation; and
    receiving, prior to the step of allocating selected ones of the identified storage resources, a new storage property for the logical expression if a desired storage property is not present in the assigned storage properties, wherein the logical expression includes a storage property not assigned to any of the storage resources, and further including:
       receiving an identification of a first one of the plurality of storage resources having the unassigned storage property; and
       allocating the first one of the storage resources based upon the logical expression.

15. The system according to claim 14, wherein the logical expression includes at least one logical operator and at least two storage properties.

16. The system according to claim 14, wherein the logical expression includes an amount of storage needed for the requested store operation.

17. The system according to claim 14, further including instructions to assign a particular one of the at least one storage properties to a particular type of storage resource.

* * * * *